Nov. 25, 1958    D. GLAXNER ET AL    2,861,294
APPARATUS FOR TREATING CARBON BLACK
Original Filed Jan. 22, 1953
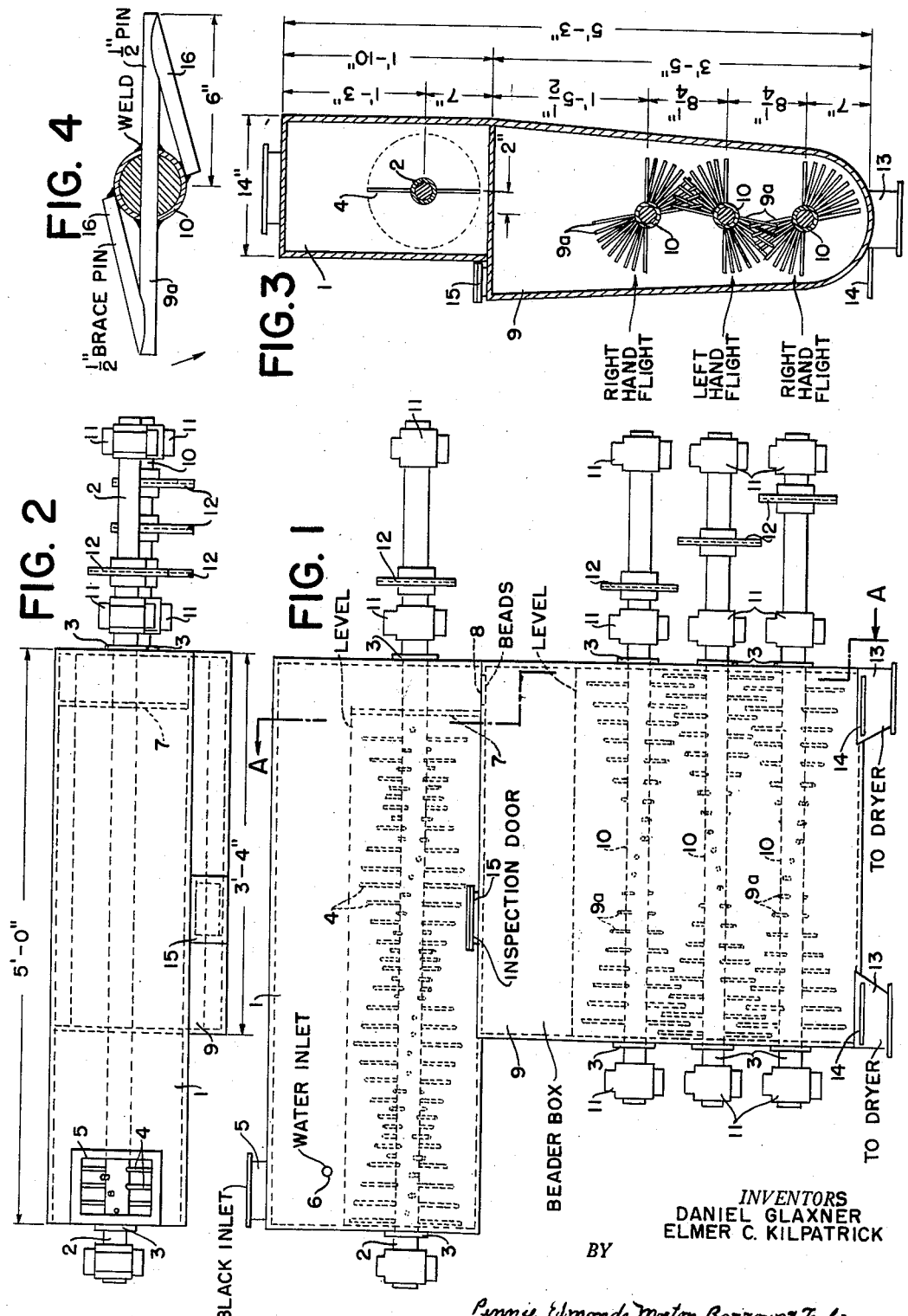
INVENTORS
DANIEL GLAXNER
ELMER C. KILPATRICK
BY
Pennie, Edmonds, Morton, Barrows & Taylor
ATTORNEYS United States Patent Office 2,861,294
Patented Nov. 25, 1958

2,861,294

APPARATUS FOR TREATING CARBON BLACK

Daniel Glaxner and Elmer C. Kilpatrick, Pampa, Tex., assignors to Columbian Carbon Company, New York, N. Y., a corporation of Delaware Original application January 22, 1953, Serial No. 332,668, now Patent No. 2,828,191, dated March 25, 1958. Divided and this application December 16, 1957, Serial No. 702,869

6 Claims. (Cl. 18—1)

The present invention relates to the pelleting of carbon black and more particularly to improved apparatus whereby carbon black pellets, or beads, of increased bulk density may be produced.

Carbon blacks, as initially produced, are extremely light, finely divided, bulky material which readily flies into the atmosphere. In the flocculent form, 50 pounds of carbon black will normally occupy a volume of 15 cubic feet, or more.

It has previously been proposed to convert finely divided carbon black to small, generally spherical, relatively dense beads, or pellets, either by violently agitating the black in the dry form or by agitating the black with approximately an equal weight of water. By either of these processes, carbon black in free-flowing, beaded form may be produced having the advantages of increased bulk density, increased cleanliness in handling and yet being capable of ready and uniform dispersion in finely divided form in rubber composition, or the like. By such processes for pelleting the black, the volume of 50 pounds of the carbon black may be reduced to about 2 cubic feet.

It is conventional practice, especially in export trade, to ship the carbon black in bags of 50 pounds each. In boat shipments, particularly, shipping costs are determined primarily by bulk. It has previously been proposed still further to decrease the bulk, and consequently the shipping costs, by subjecting the pelleted carbon black to compression. It has been found, however, that by so doing, the beads of carbon black are crushed and the black loses its free-flowing characteristics.

In our copending application Ser. No. 332,668, filed January 22, 1953, now Patent No. 2,828,191, of which the present application is a division, we have described and claimed a process whereby the bulk density of such carbon black pellets may be still further increased without destroying their free-flowing characteristics and without destroying the relatively fragile characteristics of the beads which permit their subsequent dispersion at the point of use.

The process of my said copending application is of the wet-bead type, that is, one in which the beads are formed by agitating the flocculent carbon black with water, but it differs from the conventional wet-bead process in several essential respects. The process generally consists of three steps. The first step of treating the flocculent carbon black, which may have been subjected to a predensing by conventional means to eliminate occluded gases, is similar to the conventional wet process method described in the Glaxner patent Re. 21,379, except that a substantially smaller proportion of water is used, the amount of water being restricted to a range of 35% to 45% of the black-water mixture by weight.

In the second step of the process, the preformed agglomerates passing from the first step, and without substantial drying, are subjected to a violent agitation in the manner hereinafter more fully described, and in the third step, the resultant pellets are subjected to drying in any conventional manner.

Apparatus embodying my invention and especially adapted to the carrying out of the process, just noted, will be further described with reference to the accompanying drawings, of which:

Fig. 1 is a vertical, side view;
Fig. 2 is a plan view;
Fig. 3 is a sectional view taken along line A—A of Fig. 1; and
Fig. 4 is a somewhat enlarged fragmentary, sectional view showing a modified pin construction.

The apparatus comprises an upper, elongated chamber 1 of rectangular cross-section through which there extends longitudinally a shaft 2 rotatably supported by bearings 3. A portion of the shaft within the chamber 1 is provided with a multiplicity of radially projecting pins 4, arranged to form two double helices 90° apart. The respective pins of each helix are spaced 2 inches between centers, each being removed from the next adjacent pin by an angle of 10°.

An opening 5 is provided at one end of the chamber for the introduction of the carbon black and an inlet 6 is provided for the introduction of water to the chamber. The shaft 2 is rotated by any suitable means, not shown, in a direction such that the helical rows of pins tend to move the carbon black-water mixture through the chamber toward the stationary dam member 7, advantageously of adjustable height so as to control the height of the body of carbon black retained in chamber 1. Usually, the height of the dam member 7 will be substantially that of the highest point of the orbit of the rotating pins.

Positioned just below chamber 1, and in open communication therewith through the opening 8, is a second chamber 9. Extending through chamber 9 there are three shafts 10 rotatably supported by self-aligning bearings 11, each shaft being provided with sprocket 12 whereby the shafts may be rotated, as by means of a jack shaft, not shown.

Each of the shafts 10 is provided within chamber 9 with a multiplicity of radially projecting pins 9a, arranged in a single double helix of 40 inches pitch and spaced apart about 2 inches between centers.

The lower portion of chamber 9 is provided with outlets 13 for the finished beads and, from whence, the beads may be passed to a conventional drier, not shown.

Openings 13 are provided with variable slide gates 14 for controlling the rate of discharge of beads from chamber 9. In normal operation, the level of beads is maintained at a height about that indicated in the drawing. An inspection door 15 is provided for inspecting and sampling the beads when desired.

In operation, the body of dense carbon black pellets offers very substantial resistance to the rotation of the pins and, to avoid bending the pins, it has been found frequently desirable to support each of the pins separately, as shown particularly in Fig. 4 by a rigid brace 16 secured to the outer end of the respective pins and to the shaft 10, as by welding.

The drawing represents a specific apparatus which has been used with particular advantage, in carrying out the process, and, in the drawings, dimensions of the several elements of the apparatus have been shown. It will be understood, however, that the particular apparatus represented is illustrative, and not limitative, and that the invention contemplates variations from the dimensions and arrangements of the apparatus shown, which will be apparent to those versed in the art to which the invention relates.

In the particular apparatus shown, the walls of the chambers were of 1 inch thick redwood, the shafts were 2 3/16 inch cold-rolled steel jacketed with stainless steel and the pins were of stainless steel, 1/2 inch diameter and 12 inches long, extending through the shaft, as shown in Fig. 4, to form a double spiral.

The invention and its utility will be further illustrated by the following specific examples of an operation carried out in the particular apparatus shown. Flocculent carbon black of the type known as channel black, and marketed under the registered trademark Micronex, was charged to chamber 1 through opening 5 at the rate of 500 pounds per hour, and water was introduced at a rate equivalent to 40 pounds for each 60 pounds of black. The shaft 2 was rotated at 150 R. P. M. The level of black in chamber 1 was maintained at approximately the height of the orbit of the rotating pins by suitable adjustment of the dam 7.

Moist agglomerates of the carbon black were formed in chamber 1 and overflowed the dam into the lower chamber 9, the slide gates 14 being adjusted to maintain the height of beads in chamber 9 at slightly above the upper orbit of the pins of the upper shaft 10. The three shafts 10 were rotated at 357 R. P. M., the upper and lower shafts carrying right-hand flights of pins and the intermediate shaft, carrying a left-hand flight of pins. The beads withdrawn from chamber 9 through outlets 13 were passed to a conventional drier and dried and the dried beads were found to have a bulk of 1.5 cubic feet per 50 pounds. These beads were free-flowing and were readily dispersible in rubber formulae by conventional methods.

It is important that chamber 9 be adapted to contain a relatively deep bed of carbon black so as to result in increasing compressive forces on the beads as they descend through the bed and that the upper level of the bed be high enough above the orbit of the top flight of pins so that in operation the surface of the bed has only a slight movement, if any, without separation of beads from the mass. The height of the surface above the top flight of pins should be at least 4 inches.

The operation of the first step of the process is subject to considerable variation, in accordance with conventional procedure, with the exception of the proportion of water used, which should be within the previously specified range of 35% to 45%, by weight of the water-black mixture. The speed of rotation of shaft 2 is not highly critical, but must be such as to result in carbon black agglomerates at the particular rate of feed of carbon black and water.

The speed of rotation of shafts 10 may be varied somewhat and, with advantage, should be within the range of about 300 to 360 R. P. M. It has been found that, where the speed of rotation of shafts 10 exceed about 400 R. P. M., the resultant carbon black pellets are not readily dispersed in rubber mixture, for instance. Where the shafts 10 are rotated at much below 300 R. P. M., the time required to produce pellets of the required density is increased to an extent such as to be commercially unattractive. By prolonged agitation of the beads in chamber 9, it has been found possible to reduce their bulk density to as low as 1.3 cubic feet per 50 pounds. Where the agitation has been further prolonged to produce pellets of greater bulk density, it has been found that the dispersibility of the carbon black is undesirably affected. However, such less readily dispersed beads may be of value where ease of dispersion is of lesser importance. Accordingly, the shafts 10 should be adapted to rotation at speeds within the indicated range.

Though the invention has been specifically illustrated by an operation involving the use of channel black, it will be understood that the invention is also applicable to other types of carbon black, including furnace blacks. In treating furnace black, for instance, in apparatus such as illustrated in the drawing, it is generally desirable that there be at least three shaft assemblies in the lower chamber, and preferably four such assemblies. However, in treating channel black, where maximum density is not required, the upper shaft assembly of this chamber may be omitted.

Clearances between the side walls of the chambers and the rotating pins should with advantage be quite small, advantageously of the order of 1 inch, in order to prevent pocketing of the black and uneven treatment thereof. Otherwise these clearances do not appear to be critical. It is also advantageous that the lower chamber 9 be tapered somewhat and rounded at its lower end as shown particularly in Fig. 3 of the drawings. The purpose of this is also to promote more even treatment of the carbon black pellets. However, these features are likewise not essential.

Clearances between the rotating, interdigitating pins and pin size may be varied somewhat, but most advantageously should be substantially as described with respect to the specific apparatus illustrated. The size and spacing of the pins must be such that, when the shafts are rotated, the pins on one shaft will pass between the pins on the adjacent shaft or shafts in close proximity thereto but without contact therewith.

We claim:

1. Apparatus for increasing the bulk density of beaded carbon black comprising a horizontally-elongated chamber of greater height than width, means for introducing preformed carbon black beads into the upper portion of said chamber, a plurality of rotatably mounted shafts extending longitudinally through said chamber each provided with a plurality of radially-extending pins arranged about the respective shafts in helical formation, the axes of said shafts being parallel and so positioned that in rotation the pins on the respective shafts interdigitate in close proximity to, but out of contact with, those of adjacent shafts, said shafts being adapted to be rotated at a speed of 300-400 R. P. M., means for withdrawing beaded carbon black from the lower portion of said chamber and for maintaining within said chamber a body of carbon black beads of a depth such that the upper surface thereof lies above the orbit of the pins of the uppermost shaft.

2. The apparatus of claim 1 comprising at least three shaft assemblies the axes of rotation of which lie in a common vertical plane.

3. The apparatus of claim 1 in which the helices of pins on adjacent shafts run in opposite directions about the respective shafts.

4. The apparatus of claim 3 in which adjacent shafts are adapted to be rotated in opposite directions.

5. The apparatus of claim 1 in which the lower end of the chamber is arcuated to conform generally with the lower portion of the orbit of the pins of the lowermost shaft.

6. Apparatus of the type described comprising an elongated chamber, a rotatable shaft extending longitudinally through said chamber and provided therein with a multiplicity of radially extending pins, helically arranged about said shaft, means opening into one end of said chamber adapted to the introduction of carbon black and water thereto, a second chamber communicating at its upper portion with a lower portion of the other end of the first said chamber, a plurality of rotatable shafts extending through the second chamber, each shaft being provided therein with a plurality of radially extending pins, the axes of said shafts being parallel, and said pins being arranged about the respective shafts in helical formation, the respective shafts and pins being so positioned within said chamber that when said shafts are rotated the pins on the respective shafts interdigitate in close proximity to, but out of contact with, the pins on adjacent shafts, the said shafts being adapted to be rotated at a speed of 300–400 R. P. M., said second chamber being adapted to be filled to a level such that the pins of all of the rotating shafts are completely submerged and an outlet adapted to the withdrawal of carbon black beads from the lower portion of the second chamber.

References Cited in the file of this patent

UNITED STATES PATENTS

| | | |
|---|---|---|
| 2,213,056 | Skoog et al. | Aug. 27, 1940 |
| 2,288,087 | Hanson et al. | June 30, 1942 |
| 2,306,698 | Heller | Dec. 29, 1942 |
| 2,550,802 | Gholson | May 1, 1951 |